United States Patent [19]

Elkin et al.

[11] 4,282,514

[45] Aug. 4, 1981

[54] ELECTRONIC CONVERTER

[76] Inventors: Bernard P. Elkin, 364 Arlington Ave., Brooklyn, N.J. 11208; John Mickowski, 127 Main St., Franklin, N.J. 07416

[21] Appl. No.: 108,285

[22] Filed: Dec. 28, 1979

Related U.S. Application Data

[63] Continuation-in-part of Ser. No. 974,211, Dec. 29, 1978, abandoned, which is a continuation of Ser. No. 751,645, Dec. 17, 1976, abandoned.

[51] Int. Cl.$^2$ ............................................. H03K 13/24
[52] U.S. Cl. ............................... 235/310; 340/347 DD
[58] Field of Search ............................... 235/310, 311; 340/347 DD; 364/709

[56] References Cited

U.S. PATENT DOCUMENTS

| 3,162,960 | 12/1964 | Elmlinger | 235/311 |
| 4,081,859 | 3/1978 | Goldsamt | 235/310 |
| 4,092,523 | 5/1978 | Tava | 235/310 |

Primary Examiner—Charles D. Miller
Attorney, Agent, or Firm—Eugene Lieberstein

[57] ABSTRACT

An electronic converter for converting numbers between two numeric systems, as for example, from the English to the metric systems. The converter comprises a dual keyboard for entering a number represented by a succession of digits and two calculators each having a display for displaying the contents stored in each calculator. The converter further comprises a direction control circuit which generates a signal identifying the actuated keyboard for each digit entered and a memory circuit programmed with a conversion algorithm for each direction of conversion between the two numeric systems. The appropriate conversion algorithm is selected by accessing memory in response to the actuated keyboard as identified by the direction control circuit. The selected memory information is controllably directed to one of the two calculators for performing the proper conversion. A conversion of the numerical information stored in the calculator occurs for each keyboard digit entered in the converter.

8 Claims, 8 Drawing Figures

ELECTRONIC CONVERTER

This application is a continuation-in-part of prior U.S. application Ser. No. 974,211 now abandoned filed Dec. 29, 1978 and which is a continuation of application Ser. No. 751,645 filed Dec. 17, 1976 now abandoned.

BACKGROUND OF THE INVENTION

This invention relates to an electronic converter, and, more particularly, to a converter capable of converting numbers between two numeric systems.

In various educational fields, such as economics, engineering and natural science, it is often necessary to convert numbers from one numeric system to another, or from one form to another. Generally, there is a conversion function which is utilized in going from one numeric system to the other, and an inverse or reverse function which is used in going backwards from the second numeric system to the first. In most cases, a general calculator can be utilized to perform such conversions. For example, in converting from the English measuring system to the metric system, the number is multiplied by a particular constant. In going backwards from the metric system to the English system, a different constant is utilized. When using such a general calculator for these conversions, each time a conversion is carried out, the constant must be entered into the calculator or its memory, and then the particular arithmetic function key must be operated. For example, in converting from the English system to the metric system, the constant must be entered and the multiplication key as well as the equal sign key must be operated.

While such general calculators can be utilized for these conversions, when numerous conversions must be carried out in both the forward and reverse directions, it becomes difficult to continuously enter the conversion functions and continuously depress the many keys that are needed to produce each conversion. Therefore, while general calculators have the capabilities of performing such conversions, they become difficult to work with when specialized type of conversions must frequently be performed.

There are also specialized calculators which can be specifically utilized for the purpose of individual conversions. However, such specialized calculators are mostly of the mechanical type and are, therefore, rather slow in performance, and both costly and difficult to operate. Furthermore, they generally contain only a single display whereby once the number has been entered and subsequently converted, it is no longer possible to verify that the initial number entered was correct. Additionally, even for prior art calculators with multiple displays there are many buttons and keys which must be operated in order to carry out each conversion and to provide conversions both in the forward and reverse direction.

There are also specialized nonconventional solid state calculators which are commercially available. These are however, in general, quite expensive and have many of the same operational disadvantages as indicated above particularly relating to the number of buttons and keys that must be depressed by the operator to carry out a conversion of a complete number from one numeric system into another. Where the number to be converted has many digits there is no assurance of the accuracy of the final conversion unless the operator has carefully observed the accuracy of each keyboard entry. In accordance with one embodiment of the present invention a conversion is carried out for each digit entered on the keyboard thereby always providing a direct correspondence between each successive entry and the converted number. The operator can thus always rely on the accuracy of the correspondence between each new number entered through the keyboard and the conversion without the necessity for signaling completion of the numerical entry. The latter feature of the present invention is hereinafter referred to as "on the fly conversion" and is carried out in accordance with the present invention using only standard 4 function calculator chips. A dual display is preferably used in conjunction with the dual keyboard with each display preferably dedicated to a separate numeric system. Accordingly, for each digit entered, the two displays provide a meaningful correlation regardless of how much time elapses between entries or the number of digits in the number to be converted.

SUMMARY OF THE INVENTION

It is, therefore, an object of the present invention to provide an electronic converter which avoids the aforementioned problems of prior art converters.

It is a further object of the present invention to provide an electronic converter which contains two displays, each one assigned to identify numbers in one of the two numeric systems.

Still a further object of the present invention is to provide an electronic converter which contains two displays, each dedicated to one of the two numeric systems, and having a separate keyboard dedicated to each of the two numeric systems.

A further object of the present invention is to provide an electronic converter which contains two displays, and wherein one display retains the number entered for verification while the other display exhibits the converted number.

Still another object of the present invention is to provide an electronic converter which contains a selection switch for simplified selection of the direction of conversion between the two numeric systems.

Still a further object of the present invention is to provide an electronic converter which contains a safety feature that prevents the entry of a second number until after a first number entered has either been converted or cleared.

Another object of the present invention is to provide an electronic converter which utilizes solid state components and avoids the problem of contact bounce between the various operating parts.

Yet another object of the present invention is to provide an electronic converter which utilizes standard integrated circuit components to provide an all electronic converter which is both fast and reliable.

Yet a further object of the present invention is to provide an electronic converter which can be field programmed to change the conversion algorithms to thereby select the various numeric systems between which numbers can be converted.

A further object of the present invention is to provide an electronic converter which contains a calculator containing various conversion constants between numerous numeric systems, in which constants can be selected, and wherein the displays are appropriately identified to correspond to the numeric systems being utilized.

An even further object of the present invention is to provide an electronic calculator having a dual keyboard and a dual display with one display identifying each number being successively entered through one of the keyboards in one numeric system and the other display displaying the conversion of the numerically displayed number in another predetermined numeric system.

Yet a further object of the present invention is to provide an electronic converter which is reliable, durable, low cost, efficient, simple to utilize, and small in size.

These and other objects, features and advantages of the invention will, in part, be pointed out with particularity, and will, in part, become obvious from the following more detailed description of the invention, taken in conjunction with the accompanying drawings, which form an integral part thereof.

Briefly, one embodiment of the invention describes an electronic converter for converting numbers between two numeric systems and includes an entry means for entering a number into the converter, and calculating means including the forward and reverse conversion functions between the two numeric systems for converting numbers between the numeric systems. The calculating means is responsive to the entry means and stores the number as it is entered. A direction control means is coupled to the calculating means for selecting the direction of conversion between the two numeric systems. A conversion control means is coupled through the direction control means to the calculating means for initiating conversion of the number entered in the direction selected. The calculator means then stores the converted number. A first and second display means are coupled to the calculating means. One of the displays exhibits the number entered, while the other display exhibits the converted number.

In accordance with this embodiment of the invention, the calculating means includes a first calculator circuit coupled to a first display means and contains the forward conversion function, while a second calculator circuit is coupled to the second display means and contains the reverse conversion functions. Each of the display means displays the number in the respective calculator circuit to which it is connected. In this manner, one of the calculator circuits is utilized for conversion in the forward direction and its display displays the number converted in the forward direction, as the other display retains the initial number entered, while the second calculator circuit converts the number in the reverse direction and its display exhibits the number converted in the reverse direction as the first display continues to display the number entered.

A single selection switch is coupled to the direction control means whereby the direction of conversion can be selected by manipulating a single switch. A single conversion control button is connected to the conversion control means whereby the single button is all that is needed for initiating the conversion operation.

In another embodiment of the invention the converter comprises two separate calculators each with a display and two separate keyboards each of which is dedicated to a separate numeric system. The conversion algorithms are stored in a programmable read only memory which responds to the entry of each digit through either keyboard for generating conversion data in a predetermined conversion sequence depending upon the conversion direction. The conversion data along with the keyboard entry data is controllably directed to the calculator for displaying each digit and its corresponding conversion. The converter includes conversion direction encoding means for identifying the numeric system for each keyboard entry and control means for initiating the conversion operation in response to each keyboard entry.

BRIEF DESCRIPTION OF THE DRAWINGS

In the Drawings.

In the various figures of the drawing, like reference characters designate like parts.

DESCRIPTION OF THE PREFERRED EMBODIMENTS

Figure 1:
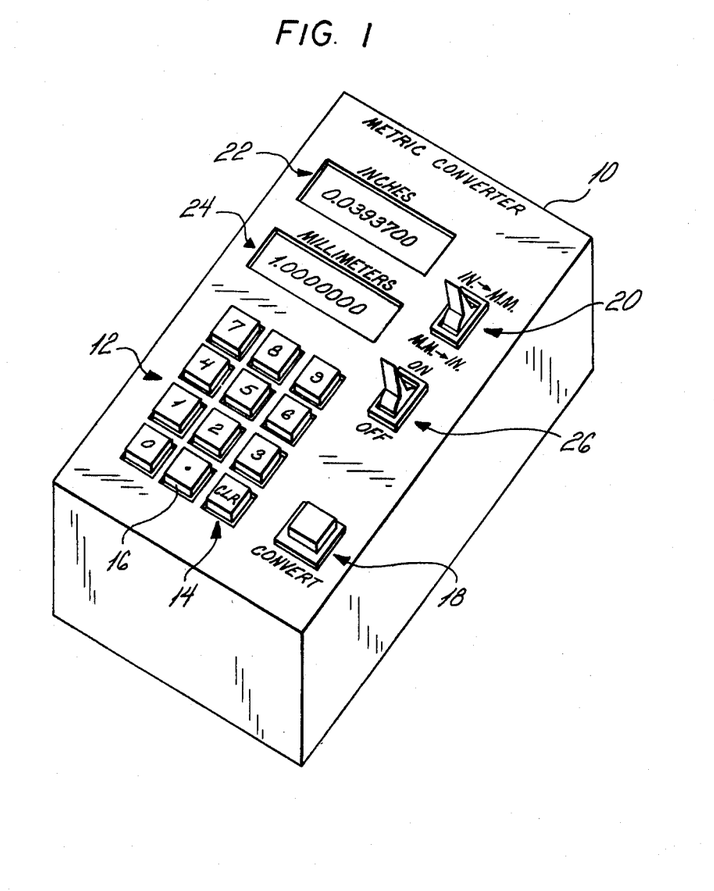
FIG. 1 shows an isometric view of the electronic converter of the present invention.

Referring now to FIG. 1 there is shown an electronic converter in accordance with the present invention described, by way of example, for use as a metric converter capable of performing numeric conversion from the English system of dimensional units to the metric system of dimensional units, and in reverse. Specifically, the electronic converter described will change inches to millimeters and millimeters to inches. For simplicity all of the embodiments of the invention will be described in connection with the conversion between these two numeric systems. The converter includes a housing 10 on which there is contained a kayboard 12 which is used to input digital information to the electronic converter. The keyboard includes keys representing the digits 0 through 9, as well as a clear button 14 and a decimal point button 16.

The convert button 18 is provided to initiate the conversion process after the number is entered on the keyboard. A two position switch 20 is provided to program the converter to convert either inches to millimeters or millimeters to inches. A first display 22, shown as an 8 digit display, is labeled in inches, while a second display 24, also shown as an 8 digit display, displays numbers in millimeters. To energize the system, an On-Off power switch 26 is provided to eliminate consumption of power when the unit is not in use.

In operation, the selection switch 20 is initially placed in one of its two positions determining whether conversion is to be from inches to millimeters or from millimeters to inches. The number including the decimal point is then entered on the keyboard 12. As the number is entered, it will be displayed on both of the displays 22 and 24 regardless of whether it was initially entered as inches or as millimeters. After the number is entered, the convert key 18 is depressed and the appropriate display will then display the converted number while the other display will continue displaying the number as it was entered.

For example, if it is desired to convert from millimeters to inches, switch 20 would be placed in its lower position. Assume the number to be converted is 1.0 millimeters. This number would be entered onto the keyboard 12, and the number would initially appear in both displays 22 and 24 as 1.0. The convert button 18 would then be depressed and the electronic converter would automatically convert the 1.0 millimeters into 0.039370 inches. The value in inches will then appear on display 22 while the number 1.0 millimeters will remain on the display 24. If a reverse conversion is wanted, the switch 20 would be placed in its upper position and numbers would be entered in inches. Initially both displays 22 and 24 would display the number entered. After the convert button 18 is depressed, the display 24 would exhibit the new number converted into its millimeter value while the display 22 would retain the value in inches as originally entered.

By utilizing the two displays, it is possible to verify the number entered even after the number has been converted. It will be noted that conversions can take place by mere depression of a single convert button 18. Once a number is entered, no other keys need be depressed except the single convert button. In this way, a series of conversions can easily be carried out going from one system to the other. Should it be desired to reverse the conversion, all that is needed is to reverse a single switch 20 and automatically conversion takes place in the opposite direction. This feature maximizes the human engineering aspect by eliminating the confusion caused by the necessity of having multiple functions for each key. Also, this system provides more convenience and avoids the possibility of erroneous operation. Furthermore, since the switch 20 need only be set once, the chance of making backwards conversion errors is reduced and considerable time is saved when doing many conversions.

The internal circuitry is arranged so that the inches and millimeters always appear on the same respective displays. In this way each display can be identified by means of indicia contained on the housing 10 and it need not be remembered which display is for which numeric system.

The entire instrument is self contained and is packaged so as to perform as a desk-top device for convenient operation by the user. The displays and the keys are large and easily identified.

The clear key 14 is provided to clear the displays to zero upon turn on of the instrument and to provide the security of starting with both displays reading "zero" before entering data. Additionally, after a conversion, the clear button can be depressed to thereby once again clear both displays and insure that no human error will be introduced.

Figure 2:
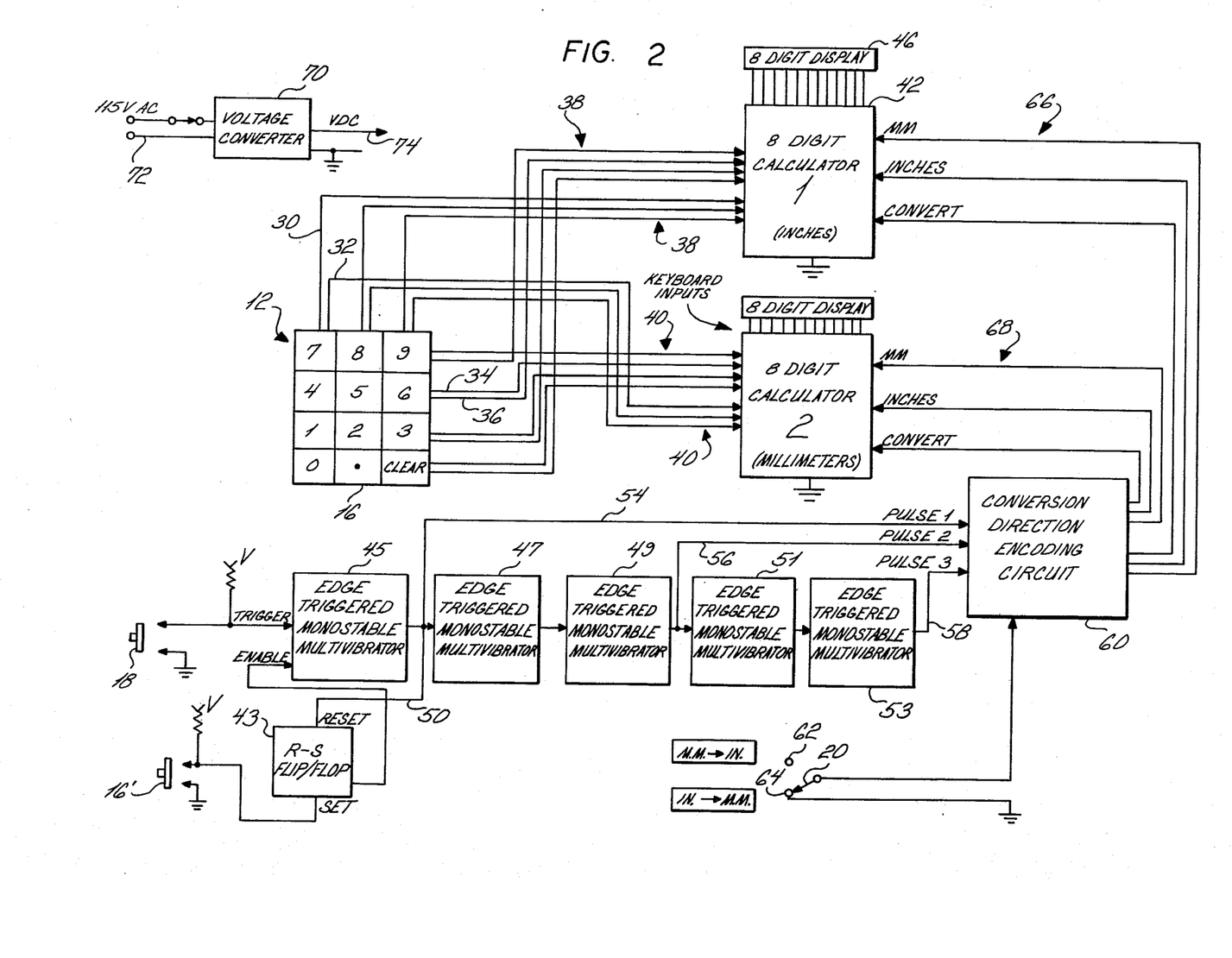
FIG. 2 shows an embodiment of the circuitry utilized in the electronic converter of the present invention.

Referring now to FIG. 2 there is shown a circuit diagram which carries out this embodiment of the present invention. The keyboard switches 12 each consist of a double pole, single throw push botton switch wired in a double cross point matrix configuration. For example, when the key 4 is depressed, the two wires 30 and 32 extending vertically from the column of switches consisting of switches 0, 1, 4 and 7, are connected individually to the two wires 34,36 extending from the horizontal row consisting of the numbers 4, 5 and 6. In this manner, the only resulting flow of electricity will be from the wires 30 and 32 and the wires 34 and 36.

The wires from the cross point matrix are separated into a first group comprising the wires 38 and a second group comprising the wires 40. These wires are respectively provided as the inputs to individual 8 digit calculators 42 and 44. The wires 38, 40 provide suitable encoding of the digital numbers entered on the keyboard 12 so that the calculators 42, 44 will recognize the number entered and respectively energize the 8 digit displays 46, 48 coupled to the calculators 42, 44. The scheme utilized is preferred to individual inputs to the two calculators in order to minimize the number of input connections required on the calculator.

Circuitry internal to the calculator circuit chips 42, 44 is used to decode the resulting 7 inputs and derive the intended information. Both calculators are wired independently except for the supply connections thereto. This is required because of asynchronous clock circuits on each of two chips and prevents interference between the two sets of calculator inputs. The calculators 42, 44 can be any of the various well known calculators provided on single chips. As the numbers are entered onto the keyboard 12, they are displayed on both displays 46, 48 following decoding by the two calculators 42,44. When the decimal point key 16 is depressed at the desired position within the number, in addition to being entered on the calculators by means of the lines 38, 40, the switch 16' is also depressed. This sends a pulse to the set input of the set-reset flip-flop 43. This causes a pulse to enable the first edge triggered monostable multivibrator 45. The multivibrator 45 remains in its enabled state until the convert key 18 is depressed which thereby triggers the multivibrator 45. The multivibrator 45 is triggered by the trailing edge of a pulse. Therefore, normally the voltage from the voltage source V provides a constant input to the multivibrator. By closing the switch 18 the pulse is shorted to ground thereby providing the negative going trailing edge which triggers the multivibrator 45. After being triggered, multivibrator 45 generates an output pulse which, on the one hand serves to reset the flip-flop 43 on line 50, and at the same time serves to trigger the next multivibrator 47 which, in turn, produces a pulse which triggers the next subsequent multivibrator 49, this continues along the sequence to then energize multivibrator 51 and 53. The output from multivibrator 45 also provides a pulse identified as pulse 1 on line 54. The output from multivibrator 49 provides a pulse 2 on line 56, and the output from the final multivibrator 53 provides a pulse 3 on line 58. The end results are three pulses, each approximately 100 milliseconds long and separated by approximately 50 milliseconds. These times are selected to correspond to the approximate minimum times to be expected from human fingers operating push buttons and are selected to fulfill the requirements of the two calculators 42,44.

The three pulses enter the conversion-direction-encoding circuit 60 which is controlled by the switch 20 to select the direction of conversion from millimeters to inches in position 62, or inches to millimeters in position 64.

The encoding circuit 60 respectively provides three outputs to each of the calculators 42, 44 on lines 66 and 68. The calculator 42 contains the necessary conversion function for converting from millimeters to inches, whereby the final output from this calculator will be in inches which will be displayed on display 46. On the other hand, the calculator 44 contains the reverse conversion from inches to millimeters, whereby the final output from this calculator will be in millimeters which will be displayed on the display 48. The encoding circuit 60 sends the first pulse to each of the two calculators along the line which corresponds to the numeric system in which the input was entered.

For example, if it is desired to convert from millimeters to inches, the initial keyboard input will be in millimeters and, accordingly, the encoding circuit 60 will send the first pulse on the millimeter line to each of the calculators 42,44. The second pulse will be sent on the lines corresponding to the final output of each calculators. Thus, the second pulse will always be sent on the inches line of calculator 42 and will always be sent on the millimeter line of calculator 44. The third pulse will be sent on the convert line of each of the calculators to initiate the conversion within the calculator having a different pulse 2 line from its pulse 1 line.

Specifically, if the conversion direction switch is in the millimeter to inches position, pulse 1 is sent to the millimeter inputs of both calculators. Pulse 2 is sent to the inches input of calculator 1 and the millimeter input of calculator 2. Pulse 3 is sent to the convert inputs of both calculators. Thus, calculator 1 first displays the inputed number in millimeters and then after conversion displays the number in inches. Calculator 2 first displays the input number in millimeters and then continues to display the number after converting it from millimeters to inches, or effectively keeping the number the same.

If the conversion, on the other hand, is from inches to milimeters, pulse 1 goes to the inches input of both calculators followed by pulse 2 which goes to the inches input of calculator 1 and the millimeter input of calculator 2. The third pulse, of course, will go to the convert inputs of both calculators. Thus, the display of calculator 1 will display the original number entered in inches and calculator 2 will display the equivalent value in millimeters.

Figure 4:
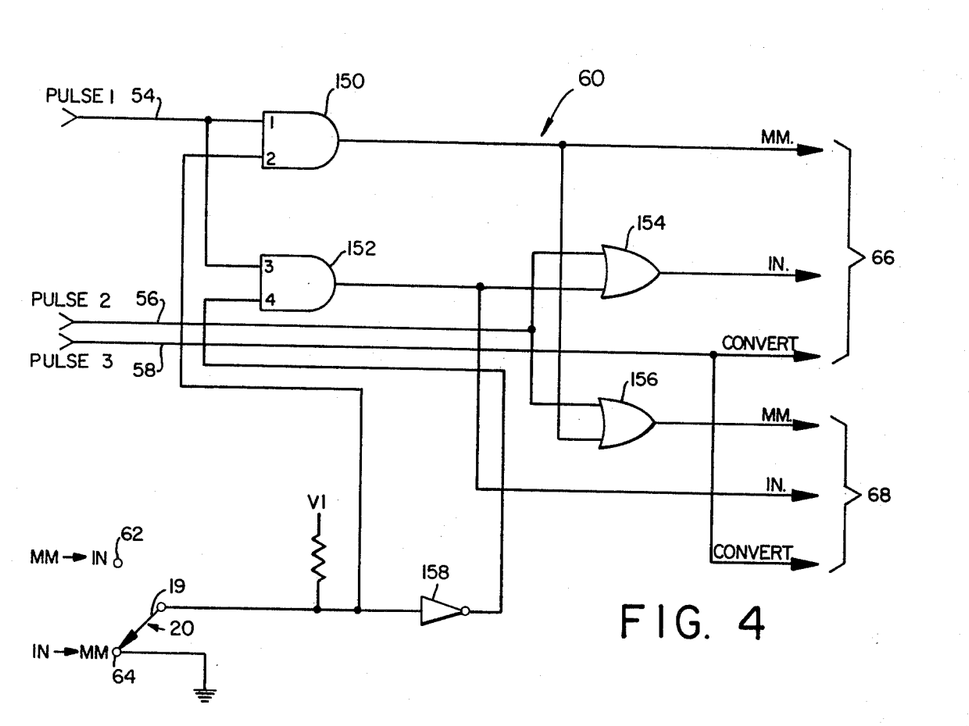
FIG. 4 is a schematic illustration of the conversion direction encoding circuit of FIG. 2.

The conversion-direction-encoding circuit 60 can be any of well known types which satisfy the requirements and, by way of example, can be an integrated circuit chip. A preferred conversion-direction-encoding circuit 60 is shown in FIG. 4 comprising a pair of And gates 150 and 152 and a pair of Or gates 154 and 156 respectively. The input terminals 1 and 3 of And gates 150 and 152 are tied in common and connected to the output lead 54 of the monostable multivibrator 45. The input terminal 2 of And gate 150 is connected to the wiper arm 19 of switch 20 which can either be placed at ground position 64 or at the open position 62. In the open position 62 a voltage proportional to the voltage V1 is impressed on the input terminal 2 of And gate 150. Voltage V1 is derived from a voltage source not shown. The input terminal 4 of And gate 152 is separated from the wiper 19 of switch 20 by an inverter 158. Accordingly, when the input at terminal 2 of And gate 150 is high the input at terminal 4 of And gate 152 is low and vice versa. The output of And gate 150 provides a driving pulse on the millimeter output lead (MM) of lines 66 and through Or gate 156 on the millimeter output lead (MM) of lines 68. The output of And gate 152 is connected through Or gate 154 to the inches output lead (in) of lines 66 and directly to the inches output lead (in) of lines 68. The output lead 56 of monostable multivibrator 49 which carries pulse 2 is connected to each OR gate 154 and 156 respectively. The output lead 58 of monostable multivibrator 54 applies pulse 3 directly through the encoding circuit 60 as the convert pulse for lines 66 and 68 respectively. As indicated earlier the spaced first, second and third pulses on lines 54, 56 and 58 respectively enter the encoding circuit 60 to provide the proper driving outputs on lines 66 and 69 depending upon the direction of conversion as selected by the position of switch 20.

By utilizing the flip-flop 43 (FIG. 2), there is provided a safety feature which prevents the initiation of a second conversion cycle until after the first conversion cycle has been completed. This avoids a double conversion which would produce an invalid display. Specifically, after the decimal point has been entered, no further new number can be entered until the convert button has been depressed, while will then convert the first number entered. Only then will the flip-flop be reset and ready to receive a second number. The clear button, of course, is connected tothe calculators to clear them of any number stored.

In the embodiment described, two separate calculators have been utilized. It is understood, that a single calculator could be utilized located on a single chip which could perform the functions of both calculator chips described.

In that case, the double cross point matrix could be replaced with a single cross point matrix. In addition, since the conversion inputs provided to the calculator are actually solid state signals, the bounce elimination circuitry generally provided to eliminate contact bounce on these inputs can be eliminated and the circuitry presently used to drive these inputs in the required manner could be replaced with one input for the initiation of the conversion process and another for the direction of conversion thereby resulting in a much simpler and less costly design.

The power can either be provided by means of a battery or a voltage converter 70 can be interconnected to a main power line plug 72 provide a DC voltage output on line 74, as for example 22 volts DC.

The circuit heretofore described utilizes standard integrated circuit components to provide a simple construction of an electronic converter. The calculators were preset to contain the conversion functions both in the forward and reverse direction between the two numeric systems. It is understood that the unit could be field programmed to perform other conversions while still maintaining the operation efficiency. This could be accomplished by inserting a card of plastic or other durable material into an appropriate reader provided in the converter. The card contains the appropriate conversion constants to thereby program each of the calculators to convert numbers between any of two different numeric systems as desired. Additionally, each card could contain the appropriate printed legends to identify the two numeric systems being utulized. These printed legends could show through windows located adjacent to the two displays to identify the two corresponding units.

Alternately, the conversion constants could be contained in memory within the unit itself and programming could be accomplished by a single input line selected by the programming card corresponding to each particular conversion. In this way, all of the constants are built into the calculator memory and a single input selects which of the various conversion constants are to be utilized by the calculator. Furthermore, other well known means could be used to provide field programming such as optically coded keys, magnetically coded cards, wired patch boards, mechanical switches, etc.

Figure 3:
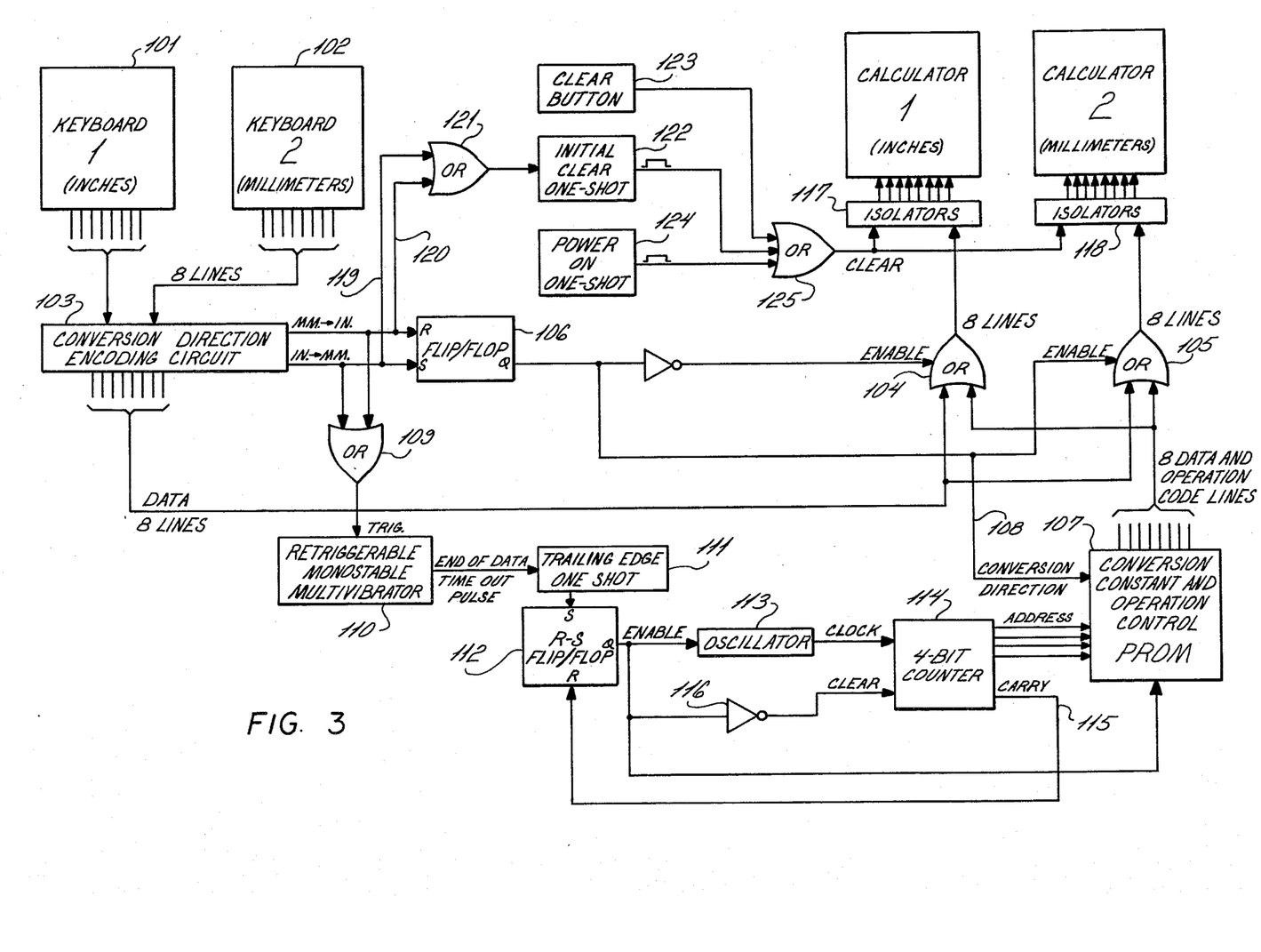
FIG. 3 shows schematically the circuitry of a two-keyboard embodiment.

A dual keyboard embodiment is disclosed in FIG. 3. Each of the keyboards is dedicated to a given one of the numeric systems, i.e., English or metric. This arrangement is advantageous in that no switching is necessary to convert the apparatus from one mode to another. Further, it permits the use of standard low-cost, four-function calculator mechanisms.

Two keyboards are provided with keyboard 101 being used for entering English system units and keyboard 102 for metric system units. Both are connected to a common conversion-direction-encoding circuit 103 which detects which keyboard is in use and activates either the MM-IN line or the IN-MM line. In addition, it inputs the 8 line data to the two "OR" circuits 104 and 105. Each of these allows the keyboard data to be entered directly into both of the four function calculators. However, the "Enable" inputs serve to permit only the appropriate calculator to receive conversion constant and operation data, while the remaining calculator preserves the original entered data on its display. An R-S flip-flop 106 is provided to activate the appropriate OR gate during the conversion sequence. Its output also provides direction information to the conversion constant and operation control PROM 107 via the conversion direction input 108.

OR gate 109 starts the conversion process by triggering the retriggerable monostable multivibrator 110. As keys are depressed, the multivibrator is retriggered until such time as a sufficient delay after the last key is depressed occurs. This delay is interpreted to mean that the last digit has been entered and that conversion should therefore begin. This time out feature obviates the need for an action on the part of the operator to initiate conversion. Upon the expiration of the end of data time out pulse, a short trigger pulse is generated by the trailing edge one shot 111. This sets the R-S flip-flop 112 which, in turn, enables the oscillator 113. Clock pulses are generated which cause the four bit counter 114 to step through the addresses of the programmable read only memory PROM 107. When the counter reaches the last address to be accessed, a "carry" output 115 is generated which, in turn, resets the R-S flip-flop 112 and stops the oscillator and clears the counter through inverter 116 in preparation for the next conversion.

The PROM 107 provides conversion constant and operation data to the appropriate calculator as the 8 bits comprising the individual words in its memory are addressed by the counter. This data is fed into the OR gates 104 and 105 but is only passed by the enabled one on to the isolators 117 and 118. By utilizing a field-programmable read only memory, any conversion may be easily provided during manufacture by simply storing the corresponding numerical constants and required algebraic operations.

The PROM 107 is a conventional programmable read only memory which is programmed with the conversion algorithms for generating operation data to permit conversion from millimeters to inches and from inches to millimeters respectively. The PROM 107 memory contents may be programmed during manufacture to provide conversion instructions in any desired sequence as is well known. Conversion direction line 108 selects the set of addresses to be interrogated and the 4 bit counter 114 sequentially steps through the selected set. For example, using a Texas Instrument PROM SN7488N having 32 addresses the first 16 may contain the program for converting from millimeters to inches and the second group of 16 addresses may contain the program for converting from inches to millimeters.

When one of the conversion lines 119 and 120 is activated, OR gate 121 triggers the initial clear one-shot 122. This, in turn, is "OR-ed" with the clear button 123 and the power on one-shot 124 via the OR gate 125. The output of the OR gate acts to clear both calculators before data is entered, during power turn on, or during a manual clear action.

Isolators 117 and 118 permit the use of calculators on asynchronous clocks. These may be eliminated when a single clock oscillation can be used to operate both calculators. However, the use of off-the-shelf calculators provides a significant cost advantage, and these generally utilize independent internal clocks. An eight digit display is associated with each calculator.

Figure 5:
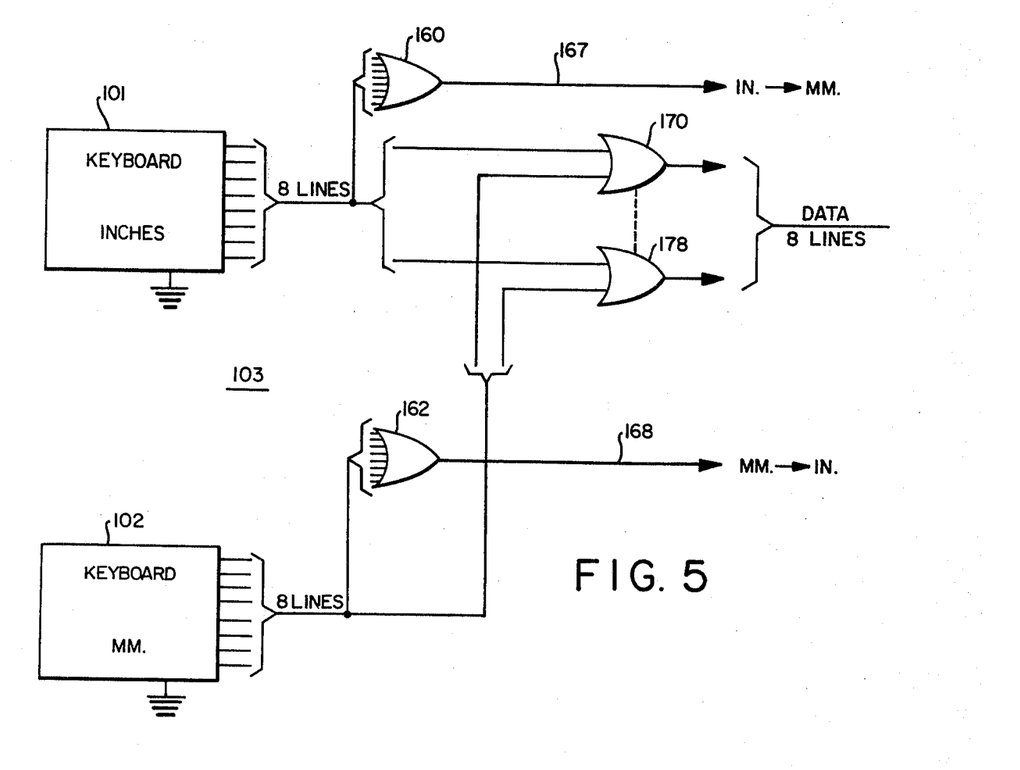
FIG. 5 is a schematic illustration of the conversion direction encoding circuit of FIG. 3.

A preferred conversion-direction-encoding circuit 103 is schematically shown in FIG. 5. The circuit 103 includes OR gates 160 and 162 each having eight input leads connected to the eight digital data output leads from keyboards 101 and 102 respectively. A plurality of eight OR gates 170 through 178, with OR gates 171 through 177 not shown, each having one input lead connected to a corresponding lead from each of the eight data output lines of keyboards 101 and 102 respectively. The output of OR gate 160 on line 167 represents the inch to millimeter lead shown in FIG. 3 and the output of OR gate 162 on line 168 represents the millimeter to inch lead shown in FIG. 3. Accordingly, and as indicated earlier, any keyboard entry from either keyboard 101 or 102 is converted to digital data on its respective output lines and passed directly through OR gates 170 to 178 onto the data 8 lines shown in FIG. 3. The signal output on line 167 or 168 determines which one of the keyboards 101 or 102 has been activated.

Figure 6:
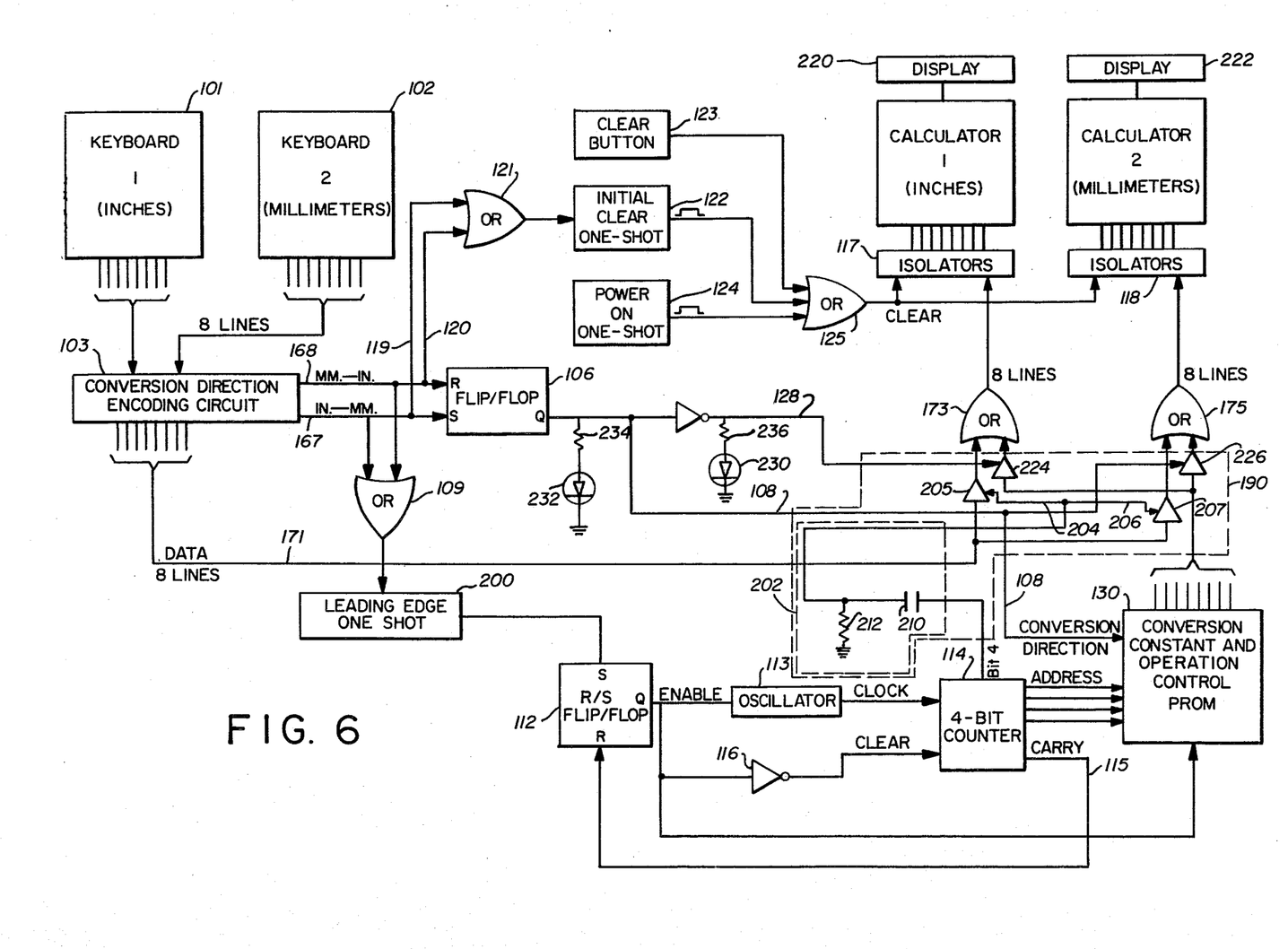
FIG. 6 is an alternative dual keyboard embodiment of the invention for performing on the fly conversion.

The dual keyboard embodiment of FIG. 3 may be used to convert each successive keyboard entry from one number system to another in an on the fly operation with minor modification to the circuit schematic as is illustrated in FIG. 6. The PROM 130 is identical to PROM 107 but is programmed in a predetermined manner for permitting on the fly conversion. The reference characters in FIG. 3 which correspond to the same circuit components in FIG. 6 are identified by the same numbers. The conversion-direction-encoding circuit 103 as explained earlier performs the function of detecting which of the keyboards 101 and 102 has been activated. This occurs as explained in conjunction with FIG. 5 by providing an output pulse on either line 167 or 168 in response to a keyboard entry in either of keyboards 101 and 102 respectively. The output pulse on lines 167 or 168 is applied to the RS flip-flop 106 to cause its Q terminal to go high when it receives a set input and to go low when it receives a reset input. Accordingly, the high or low output of flip-flop 106 on line 108 determines the direction of conversion.

The digital data from either keyboard 101 or 102 is transferred through the direction-encoding-circuit 103 onto the eight data lines 171. The keyboard data on lines 171 is steered through a gating circuit 190 through the OR gates 173 and 175 to the calculators 1 and 2 under the control of the read only programmable memory 130. The group of addresses to be read in PROM 130 is determined by the logical state of the conversion direction line 108. Each address in the selected group is sequentially read by the counter 114 in conjunction with the counter control circuitry including oscillator 113, RS flip-flop 112 and the one-shot multivibrator 200 which is triggered on its leading edge as opposed to its trailing edge described in connection with FIG. 3. The PROM 130 is programmed in a conventional manner to contain instructional data for the calculators 1 and 2 representing the conversion algorithm for converting between the two desired number systems. The program is, however, arranged in a predetermined sequence in memory so as to permit automatic on the fly conversion to occur in response to each successive entry of a digit through the keyboard. The program sequence is illustrated by the following Table:

| | | PROM 130 32 × 8 bit memory | | | |
|---|---|---|---|---|---|
| | MM - INCHES SEQUENCE | | | INCHES - MM SEQUENCE | |
| COUNT | ADDRESS | MEMORY CONTENTS | COUNT | ADDRESS | MEMORY CONTENTS |
| 00000 | 0 | × | 10000 | 16 | ÷ |
| 00001 | 1 | 2 | 10001 | 17 | 2 |
| 00010 | 2 | 5 | 10010 | 18 | 5 |
| 00011 | 3 | . | 10011 | 19 | . |
| 00100 | 4 | 4 | 10100 | 20 | 4 |
| 00101 | 5 | = | 10101 | 21 | = |
| 00110 | 6 | | 10110 | 22 | |
| 00111 | 7 | | 10111 | 23 | |
| (Bit 4) 01000 | 8 | | 11000 | 24 | |
| 01001 | 9 | ÷ | 11001 | 25 | × |
| 01010 | 10 | 2 | 11010 | 26 | 2 |
| 01011 | 11 | 5 | 11011 | 27 | 5 |
| 01100 | 12 | . | 11100 | 28 | . |
| 01101 | 13 | 4 | 11101 | 29 | 4 |
| 01110 | 14 | = | 11110 | 30 | = |
| 01111 | 15 | | 11111 | 31 | |

The above Table identifies each algebraic instruction stored in the PROM memory at the predetermined address location corresponding to the output count from counter 114. Unused memory locations contain nulls. Accordingly, the first sixteen addresses are used to effect the conversion of millimeters to inches whereas the second sixteen addresses are used to effectuate the conversion of inches to millimeters. The logical state of the conversion direction line 108 determines the selection between the two groups of addresses.

OR gate 109 starts the conversion process for each digit entry into either keyboard 101 or keyboard 102. In either case the OR gate 109 triggers leading edge one-shot monostable multivibrator 200 which immediately sets RS flip-flop 112. Once RS flip-flop 112 is enabled the oscillator 113 begins to generate appropriate clock pulses permitting the four bit counter 114 to step through the group of addresses of PROM 130 selected by the direction line 108.

Bit four from the 4-Bit counter 114 is connected through a timing circuit 202 to the enable leads 204 and 206 of the buffer gates 205 and 207 respectively. The timing circuit 202 comprises a capacitor 210 and resistor 212 having a predetermined time constant preferably set to correspond to one count time of the counter 114. Accordingly, when Bit 4 goes high, which occurs in the mm to inch sequence at the count of eight and in the inch to mm sequence at the count of twenty-four, the buffer gates 205 and 207 are enabled for a short time period sufficient to transfer the keyboard data corresponding to a digit entry through the OR gates 173 and 175 respectively. The output of the OR gates 173 and 175 are applied to each calculator 1 and 2 respectively through the isolators 117 and 118 exactly as explained in connection with FIG. 3. Upon entering the calculators 1 and 2 the data is displayed in each of the eight digit displays 220 and 222 respectively. The data appends to any previously entered digits in a conventional manner. The memory instructions in PROM 130 is then transferred through one of the buffer gates 224 or 226 to calculators 1 or 2 upon the presence of an enable pulse on line 128 or 108 respectively. Buffer gate 224 is enabled when the output of flip-flop 106 is low and buffer gate 226 is enabled when the output of flip-flop 106 is high. Accessory indicators such as LED 230 and LED 232 provide additional verification to the operator of the most recent keyboard in use. In this way any possible confusion as to the direction of conversion between keys is eliminated. Resistors 234 and 236 limit the current to the LED's 232 and 230 to safe levels.

By way of example, assume the number 222 is to be converted from English units to metric units. The first digit 2 is entered through keyboard 1 setting flip-flop 112 and initiating an immediate conversion operation. Following the inches to millimeters sequence in the Table calculator 1 will display the digit 2 and calculator 2 will display the metric equivalent. Upon the entry of the second digit 2 calculator 1 will display 22 and calculator 2 will first perform the reverse operation of dividing by the conversion constant 25.4 to restore the original number which operation is followed by entry of the keyboard digit two at the count of 24. The entry of the digit 2 appends to the first digit 2 in the calculator to form the number 22. This operation is followed by a metric conversion of the number 22 between the count of 25 to 30. The third digit 2 causes a similar on the fly conversion with calculator 1 appending the digit 2 to the number 22 and calculator 2 instructed to first perform a reverse calculation to reestablish the equivalent number in english units, followed by entering the third digit and appending it to the number 22 to form 222 and then performing a metric conversion on the complete number 222. It should be understood that this process occurs too quickly to follow visually on the display. Accordingly, the viewer sees a true correspondence between each newly entered number and its conversion. Conversion from metric to english will cause a similar operation to take place in calculator 1 under the instructions provided by PROM 130 as illustrated in the Table.

Figure 7:
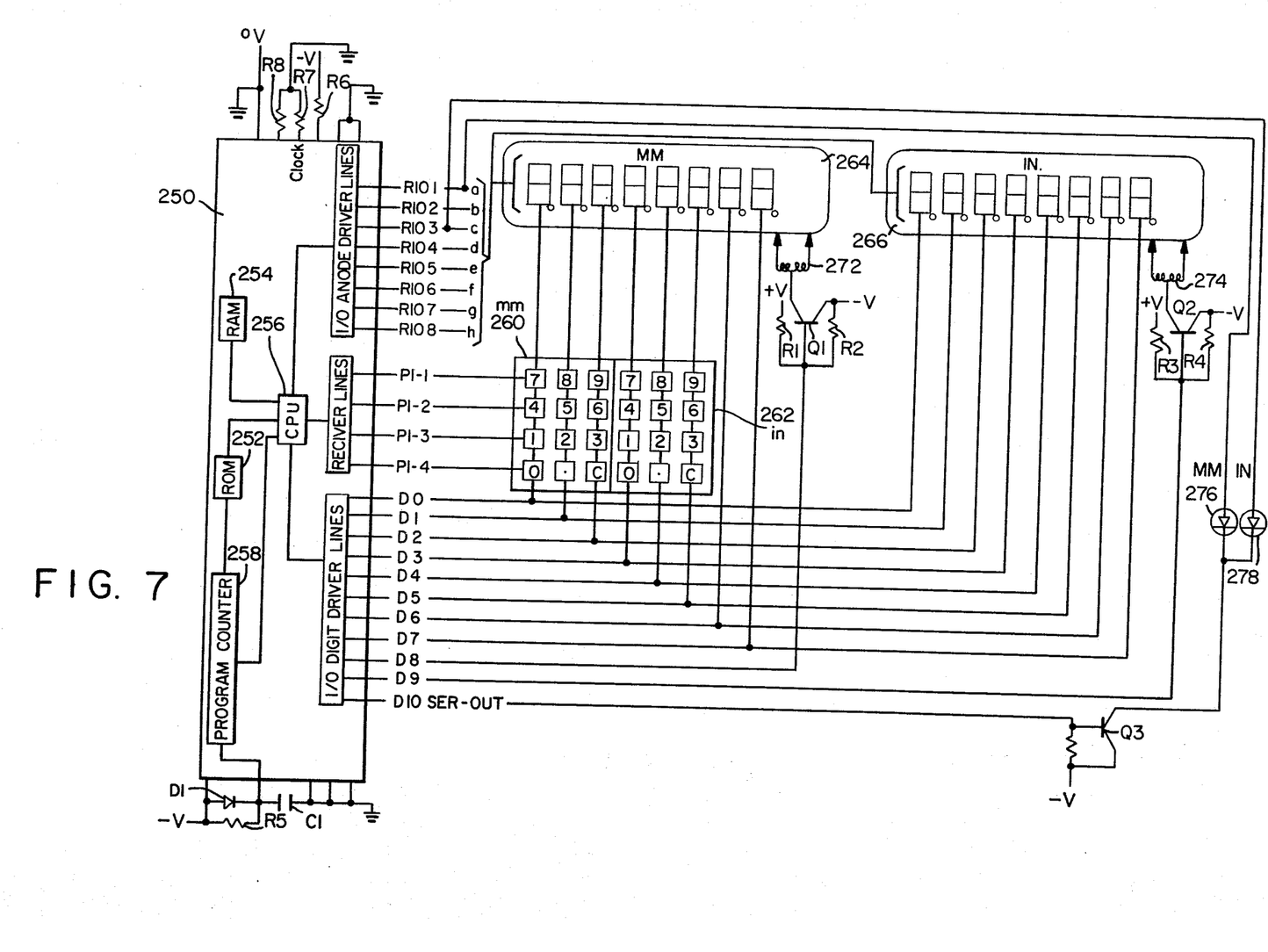
FIG. 7 is a further dual keyboard, dual display embodiment of the invention employing a microprocessor.
Figure 8:
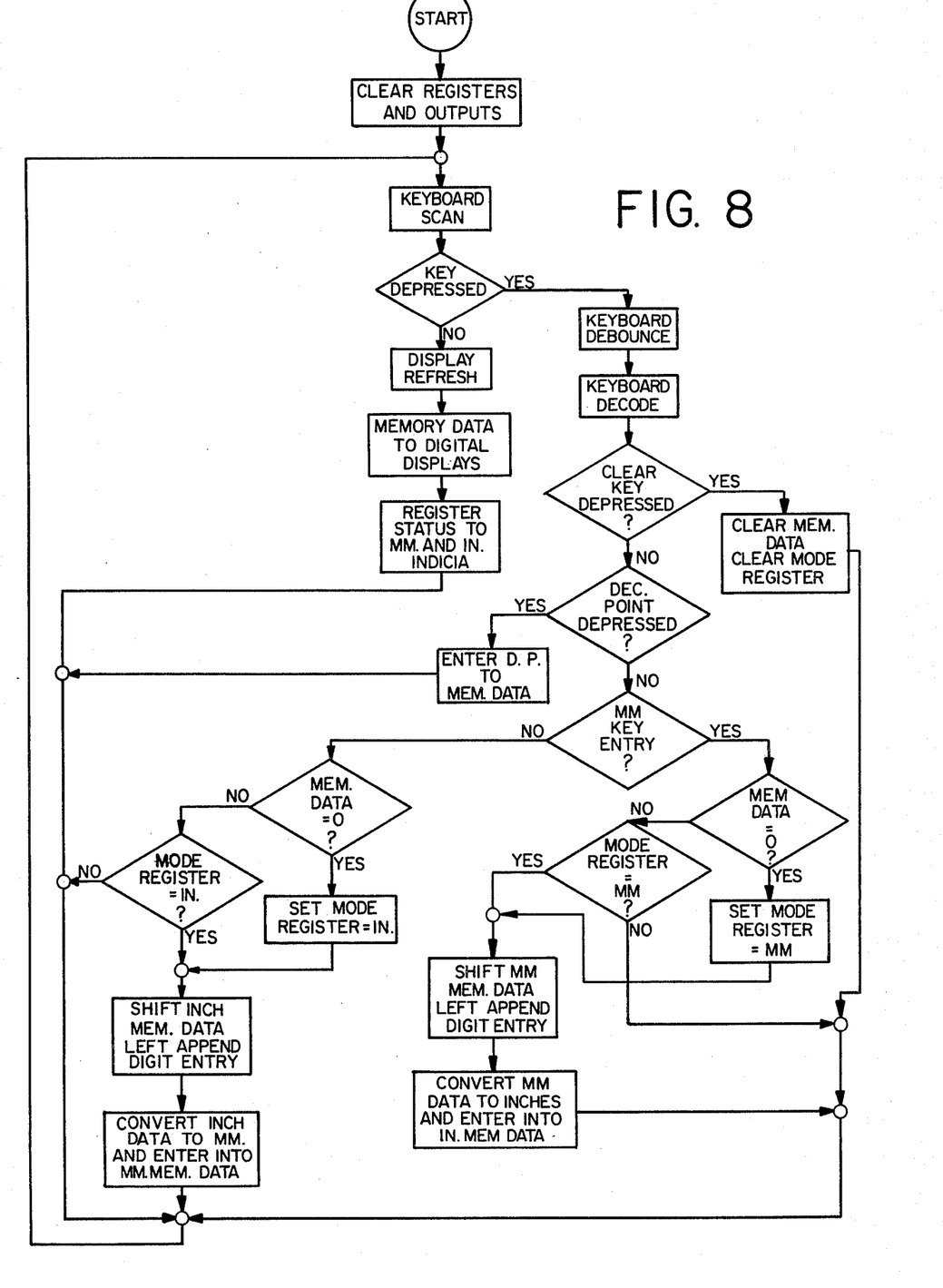
FIG. 8 is a simplified flow diagram for operating the microprocessor illustrated in FIG. 7.

The memory circuit means of the present invention has been described heretofore relative to a programmable read only memory such as PROM 102 or 103 in connection with FIG. 3 or FIG. 6 respectively. It is also within the concept of the present invention to use the memory, both read only and random access, of a conventional microcomputer as the memory circuit means. Accordingly, a conventional microcomputer 250 such as the Rockwell Intl. MM 76 may be used as shown in FIG. 7 to control a dual keyboard and dual display system to provide on the fly conversion in accordance with a program as illustrated in the flow diagram of FIG. 8.

The calculator instructions and the memory instructions are preferably mask programmed into the read only memory (ROM) 252 of the microcomputer 250. The microcomputer random access memory (RAM) 254 is preferably used to store the digit information in each of the desired numeric systems in separate mode registers within RAM. The CPU 256 operates to enable the program counter 258 upon decoding instructions defining the key depressed in either the millimeter (mm) keyboard 260 or the inches (in) keyboard 262 respectively. The CPU 256 also determines the direction of conversion by selecting the set of addresses to be sequentially accessed by the program counter 258 in response to the identification of the depressed key.

The 10 discrete input/output lines represented by D0–D10 determines which digit is selected for display in the appropriate millimeter (mm) or inches (in) display 264 or 266 respectively. The four PI receiver lines are connected in common to both keyboards 260 and 262 for establishing a conventional single cross point matrix arrangement with the digit driver lines D0–D7. Accordingly, detection of a depressed key is determined by scanning the column lines D0–D7 and looking at the active one of the four PI lines PI-1–PI-4. The most recent key depressed determines which conversion direction the program is operating in.

The displays 264 and 266 are digitally controlled fluorescent displays although other conventional displays such as light emitting diodes, gas discharge or liquid crystal displays may be used. The displays 264 and 266 are activated in a matrix fashion via anode seven segment drivers R101 through R107 in combination with the digit drive select lines D0 through D7 according to well known practice. Data for the millimeter display 264 is impressed on these driver lines simultaneously with the activation of line D8, which enables display 264. Data for the inches display 266 is impressed on the driver lines simultaneously with the activation of line D9 which enables display 266. When line D8 is in the active low state, the bias network consisting of resistors R1 and R2 turn on transistor Q1 to provide a current path for the cathode filament in the display 264 through a transformer winding 272 thereby causing the display 264 to illuminate the numerical information corresponding to the digit data on the impressed anode and digit drive lines respectively. In an identical fashion when line D9 is in the active low state, the bias network consisting of resistors R3 and R4 turn on transistor Q2 to provide a current path for the cathode filament in the display 266 through the winding 274 thereby causing the display 266 to illuminate the numerical information corresponding to the digit data on the impressed anode and digit drive lines respectively.

In operation, each of the 8 digits in display 264 is activated in succession, followed by each of the 8 digits in display 266 followed by the illumination of either the millimeter or inches signal indicators 276 and 278 respectively. After drive lines D8 and D9 are reset to the inactive high state, the serial output line D10 is set to the active low state which enables transistor Q3. If millimeter data is being entered, the drive line R101 is set to the active high state to illuminate the millimeter indicator 276. Similarly, if inch data is being entered, the drive line R103 is set to the active high state, and the inches indicator 278 will illuminate.

Entry to either keyboard causes the indicator corresponding to the unit system assigned to that keyboard to light and the digit corresponding to the key depressed to be displayed in the corresponding display. Simultaneously, the updated number displayed is instantly converted to the equivalent in the other unit system, and displayed in the corresponding display. Each Additional digit is appended to the previously entered digits and a new conversion is automatically initiated as clearly indicated from the flow diagram of FIG. 8. This process continues until either clear key is depressed, upon which both displays are cleared. The next numeric key to be depressed restarts the procedure. In this manner, the possibility of displaying a pair of numbers which are not equivalents is eliminated. The network formed by resistor R5, diode D1, and capacitor C1 reset the program counter 258 of the microprocessor 250 to the initial starting location upon turn on. The resistors R6, R7, and R8 provide bias currents for the internal operation of the clock internally provided in the microprocessor 250.

What is claimed is:

1. An electronic converter system for converting numbers from a first to a second numeric system comprising:

A first and second keyboard with each dedicated to a separate one of said numeric systems and adapted to generate digital data representative of each keyboard digit entry;

means for generating a conversion direction signal from each keyboard digit entry, with each direction signal having a logical state corresponding to the selected keyboard through which a digit has been entered;

first and second calculating means responsive to the digital data generated from said first and second keyboard for storing each keyboard digit in a serial fashion;

first and second display means coupled to said first and second calculating means for exhibiting the number defined by the digits stored in said first and second calculating means respectively with said first display means exhibiting the stored number in said first numeric system and with said second display means exhibiting the stored number in said second numeric system;

memory means containing in storage at a first group of predetermined address locations the conversion algorithm instructions for performing a conversion operation of a digit from said first to said second numeric system and containing at a second group of predetermined address locations the conversion algorithm instructions for performing a conversion operation of a digit from said second to said first numeric system;

means for accessing information from said first or second group of address locations in said memory means in response to each conversion direction signal; and means responsive to each conversion direction signal for steering said accessed information from said memory means to the corresponding first or second calculating means for performing a conversion operation on the number stored therein.

2. An electronic converter system as claimed in claim 1 wherein said means for steering said accessed information comprises logic gating circuitry responsive to the logical state of said conversion direction signal for directing said accessed information to a predetermined one of said calculating means for performing said conversion operation.

3. An electronic converter system as claimed in claim 2 wherein said means for accessing said memory means comprises a counter and counter control circuitry, said counter control circuitry being responsive to said conversion direction signal for initiating the conversion process.

4. An electronic converter system as claimed in claim 3 wherein said counter control means includes means for timing the duration of the conversion process.

5. An electronic converter system as claimed in claim 3 wherein said memory means is a programmable read only memory.

6. An electronic converter system as defined in claim 5 wherein said programmed instructions within said first and second groups of address locations are arranged to initiate a conversion sequence in said predetermined calculating means for each keyboard digit entry such that the number exhibited in each display corresponds to one another independent of the number of digits entered.

7. An electronic converter system as defined in claim 6 further comprising indicating means for identifying the direction of conversion between said numeric systems.

8. An electronic converter system as defined in claim 1 wherein said conversion direction signal is generated by the central processing unit (CPU) of a microprocessor and wherein said memory means comprises the programmable read only memory of a microprocessor.

* * * * *